United States Patent [19]
Buxmann

[11] 3,732,803
[45] May 15, 1973

[54] DEVICE FOR TOASTING AND/OR GRILLING

[75] Inventor: Heinrich-Julius Buxmann, Steinbach/Taunus, Germany

[73] Assignee: Braun A.G., Frankfurt/Main, Germany

[22] Filed: Feb. 8, 1971

[21] Appl. No.: 113,372

[30] Foreign Application Priority Data

Feb. 17, 1970 Luxembourg ............................ 60362

[52] U.S. Cl. ........................ 99/357, 99/401, 99/447, 126/39
[51] Int. Cl. ............................................. A47j 37/08
[58] Field of Search ...................... 99/357, 367, 385, 99/394, 400–401, 444, 446, 447; 126/39 M; 206/4, 56, 58

[56] References Cited

UNITED STATES PATENTS

| 2,555,416 | 6/1951 | Marano | 126/39 M UX |
| 2,882,890 | 4/1959 | Shaw | 126/39 M UX |
| 2,912,559 | 11/1959 | Kirschke | 126/39 M X |
| 3,141,590 | 7/1964 | Anderson | 126/39 M X |
| 3,152,242 | 10/1964 | De Mott | 99/401 X |
| 3,193,663 | 7/1965 | Budzich et al. | 126/39 M UX |
| 3,334,620 | 8/1967 | DeWerth | 99/401 UX |

*Primary Examiner*—William I. Price
*Assistant Examiner*—Arthur O. Henderson
*Attorney*—Ernest F. Marmorek

[57] ABSTRACT

A device for heat-treating, such as toasting and/or grilling, foodstuff, has a housing, a foodstuff supporting grid, a heating element, and a metal foil reflector that is supported in an easily exchangeable manner with relation to a reflector support.

14 Claims, 5 Drawing Figures

DEVICE FOR TOASTING AND/OR GRILLING

The invention relates to devices for heat-treating foodstuff, such as toasting and/or grilling foodstuff, or subjecting them to an au gratin treatment or other conventional well known heat treatment of foodstuff. The invention relates more particularly to such devices that include a reflector that reflects and guides towards the foodstuff heat rays that emanate from a heat source.

BACKGROUND OF THE INVENTION

Devices of the foregoing type include reflector means which usually include either one or several individual reflectors, and these reflectors are composed either of stainless material which is polished to a high gloss on the surface that faces the heat source, or the reflectors on that surface are provided either with a high gloss chromium finish or a high gloss metal finish.

Most of the foregoing devices of the prior art have, however, the disadvantage that the reflectors are not easily accessible and hence are difficult to clean. Cleaning of the reflectors, on the other hand, is of great importance: the reflector surfaces must be kept clean not only for sanitary and aesthetic reasons, but also for maintaining a uniform heat radiation onto the foodstuff; prolonged use of such devices causes a soiling of the reflector surfaces by sprays of grease or water or other ingredients of the foodstuff during the grilling or other heat treatment, and this soiling causes a non-uniform guiding of the heat radiation towards the foodstuff. Hence, for all these reasons a proper and hygienic working of devices of this type requires a clean reflector surface or surfaces.

As previously indicated, however, cleaning of these reflector surfaces in the prior art devices has met with difficulties. The exchanging of the reflectors of prior art devices usually has required the services of a professional expert, and the need for spare parts with all the difficulties attendant upon the keeping of a supply of spare parts on hand. The cost of maintaining clean surface reflectors thus has proved to be unreasonably high as compared to the initial cost of the device.

SUMMARY OF THE INVENTION

It is accordingly among the principal objects of the invention to provide a device for heat treating, such as toasting and/or grilling or the like, the reflector of which is easily interchangeable.

It is another object of the invention to provide such a device in which the exchange of reflector is done in a simple and inexpensive manner.

It is a further object of the invention to provide a device in which the exchange of reflectors can be carried out by inexperienced persons, and without any special tools.

Further objects and advantages of the invention will be set forth in part in the following specification and in part will be obvious therefrom without being specifically referred to, the same being realized and attained as pointed out in the claims hereof.

Broadly speaking, the instant invention provides for reflector means in such a device which includes an easily exchangeable flexible metal foil. This metal foil has a surface that serves to reflect the heat rays from the heat source to the foodstuff, and after it has been subjected to soiling in the aforedescribed manner, the flexible metal foil reflector can be exchanged.

Flexible metal foils of this type may be a commercially available foil such as generally sold for household use and often termed "wrap," for the wrapping of fresh food and sandwiches or the like. In accordance with a preferred embodiment, however, a special flexible metal foil is used for the instant purpose, which is pre-cut into a sheet or sheets of the required size, and has a thickness which is so dimensioned that it gives sufficient stiffness to avoid crumbling during insertion, thereby avoiding the drawbacks of non-uniform reflection attendant upon crumpled reflector metal foils.

In accordance with another embodiment of the instant invention, the metal foils may be pre-formed, for the purpose of improving the stiffness of such a metal foil which otherwise has the usual thickness.

The instant invention furthermore provides for support means, such as a backing or support for the metal foil, to define the required form of the metal foil reflector; and the metal foil may be aligned against the support means in an easily detachable manner. A flexible metal foil for this purpose is a foil which may be applied without noticeable force either around or in such a support means, and assumes the required form defined by the support means.

The aforesaid support means may be formed as a continuous wall, or as a frame or a grid. Arrangement in grid form offers the possibility of placing the grid support means on that side of the metal foil that faces the heat source. As the form of the reflector is often paraboloid or ellipsoid, it offers a certain simplicity to place the metal foil around a convex rather than a concave support means.

The instant invention also provides for a metal foil that carries on the surface, which is opposite to the surface that faces the heat element, an adhesive coating, preferably of the self-sticking type.

The instant invention furthermore provides for a support means of the foregoing type which includes a support in the form of a curved clip or shackle, and in accordance with a preferred embodiment at least two of such shackle-type supports are provided in order to hold the metal foil securely.

The instant invention furthermore provides for support means which include a support and a backing, with the metal foil sandwiched therebetween, which offers the advantage of uniform positioning of the metal foil in the desired shape relative to the heat source for optimum heat radiation guidance towards the foodstuff.

In accordance with a further embodiment, the instant invention provides for such a device which houses a roll of metal foil with a free portion extending from the roll and forming the reflector. Whenever exchange of the reflector is needed, the soiled reflector may be pulled out and be severed, and a fresh portion be placed instead.

The invention furthermore provides for hinging of the support means relative to the housing of the device, thereby facilitating the insertion and removal of the reflector metal foil.

With the above and other objects of the invention in view, the invention consists in the novel construction, arrangement and combination of various devices, elements and parts, as set forth in the claims hereof, certain embodiments of the same being illustrated in the accompanying drawings and described in the specification.

BRIEF DESCRIPTION OF THE DRAWINGS

In the accompanying drawings

DESCRIPTION OF THE PREFERRED EMBODIMENTS

Figure 1:
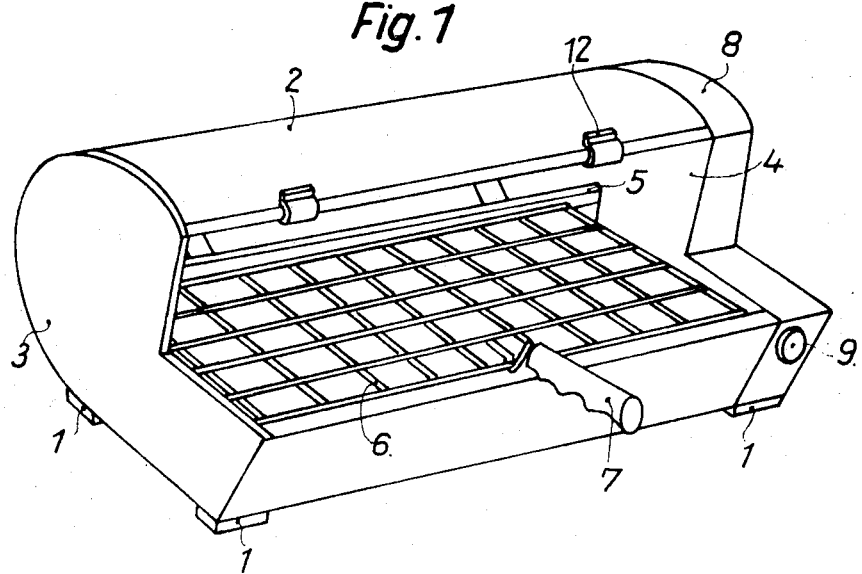
FIG. 1 is a perspective view of a device for toasting and/or grilling, in accordance with the invention.
Figure 2:
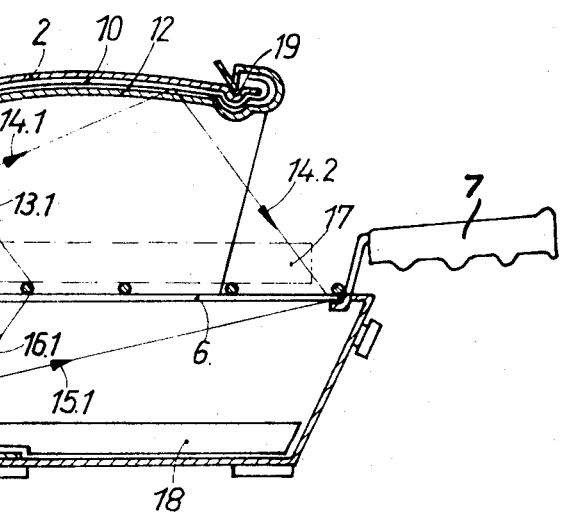
FIG. 2 is a large scale vertical sectional view of the device shown in FIG. 1, taken on a secant plane that passes through one of the curved clipped supports 12.

In carrying the invention into effect in three embodiments which have been selected for illustration in the accompanying drawings and for description in this specification, and referring now particularly to FIGS. 1 and 2, there is provided a device for heat treating, such heating toasting and/or grilling foodstuff. The device has legs 1, and a housing is supported by and surmounts the legs 1.

Figure 2A:
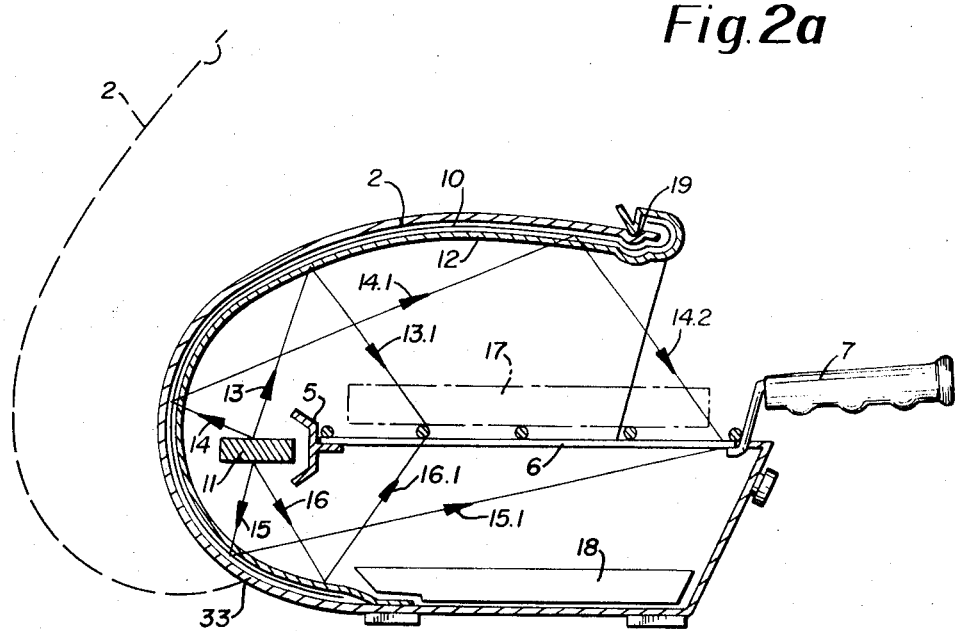
FIG. 2a is a sectional view similar to FIG. 2 embodying a modification.
Figure 3A:
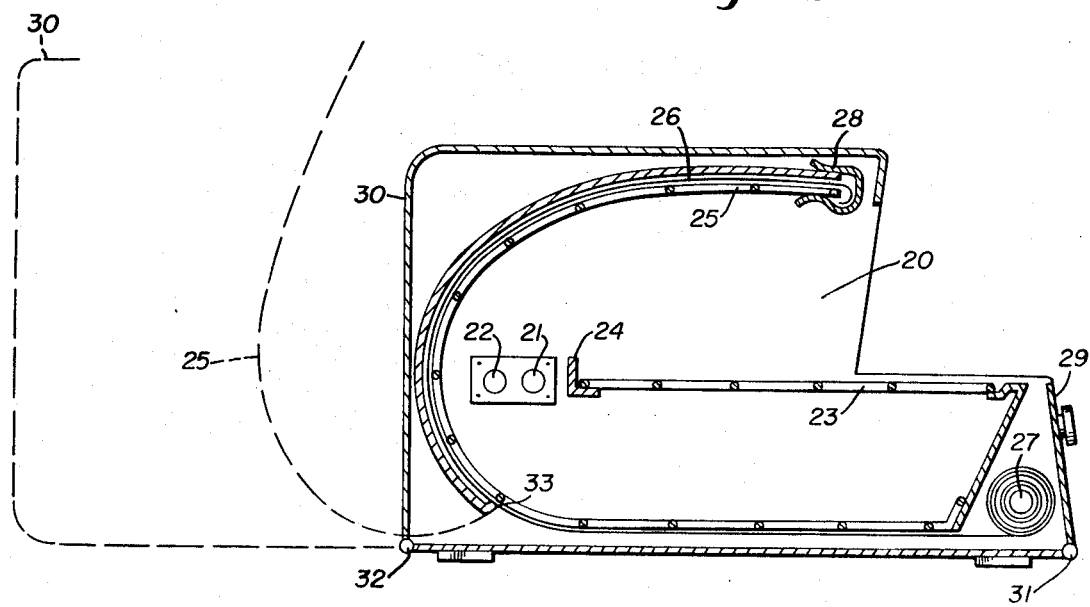
FIG. 3a is a sectional view similar to FIG. 3 but embodying a modification and showing two positions of some parts.

The housing includes the sidewalls 3 and 4. Between these sidewalls 3 and 4, there is arranged a support means, namely a backing 2. This support means may be hinged at 33 as shown in FIGS. 2a and 3a, and may furthermore include one or more, for instance two supports 12 in the shape of curved clips or shackles; two supports 12 are shown in FIG. 1, and their shape is indicated in FIG. 1.

Inside the housing there is provided a shield 5 behind which there is arranged a heat source, such as a heating element 11. Reflector means are provided which include the aforesaid support means, namely the backing 2 and/or the supports 12, as well as a reflector 10.

The housing defines a food receiving and treating chamber, and a carrier 6 is removably mounted in said chamber in front of the shield 5. The carrier 6 has a handle 7 with which the carrier 6 may be moved in and out of the chamber, for loading, unloading as well as cleaning; the removal of the carrier furthermore permits the cleaning of the interior of the chamber.

Near the sidewall 4 there is provided an enclosure 8 for the electric equipment including the necessary electric wiring and the like, and which comprises a switch 9 to control the electric current for regulating the heat that emanates from the heat source 11.

A reflector 10, as previously indicated, is a flexible metal foil. It is composed of aluminum or a suitable aluminum alloy, or the like; as previously indicated it may be pre-cut and pre-formed for sufficient stiffness and thickness.

As best shown in FIG. 2, foodstuff 17 to be heat treated is placed on the carrier 6 in the chamber. In this position, the reflector 10 will guide the heat rays that emanate from the heat source 11 towards the foodstuff 17. The heat rays are indicated schematically, and only by way of exemplification, by the arrows 13, 13.1, 14, 14.1, 14.2, 15, 15.1, 16, and 16.1 in FIG. 2. The The backing 2, as best shown in FIG. 2, has a form which corresponds to the desired shape of the reflector 10, and hence defines the shape of the reflector 10. The reflector 10, as previously indicated, is a thin flexible metal foil which, as shown in FIG. 2, lines the interior surface of the backing 2 and is curved about the heat source 11. In the embodiment shown in FIGS. 1 and 2 there are further indicated supports 12 which support the inner, reflecting surface of the reflector 10, and thus aid in defining the shape of the reflector 10.

The shield 5 serves the purpose to prevent heat rays from reaching the foodstuff 17 directly, thereby restricting the heat radiation from reaching foodstuff 17 only by reflection from the reflector 10.

A receptacle 18 is provided near the bottom of the chamber, to receive crumbs, as well as drippings of grease, cheese, or other food ingredients that fall off the foodstuff 17.

As initially indicated herein, the ingredients sprayed off the foodstuff 17, however, do not only land in the receptacle 18, but also reach reflector 10, and adhere to the reflector surface and thereby soil it and render it more or less blind and non-reflecting.

In order to restore the desired high gloss to the reflecting surface, however, the instant invention does not require any cleaning of the reflector surface, but provides for an exchange of the reflector 10.

As best shown in FIG. 2, the shackle-type supports 12 rest in a groove 19 of the backing 2. For exchanging the reflector 10, the operator will disengage the end of the shackle supports to form the groove 19 and disengage the supports 12 from the metal foil 10. The metal foil 10 thereupon may be removed, and a new metal foil with a high gloss reflecting surface be inserted instead and the supports 12 be put in place again and reengage with their wedge in the groove 19.

No special tools, nor any special skill are necessary for this exchange, although, of course, conventional tools may be used in aid of the exchange, if desired.

Figure 3:
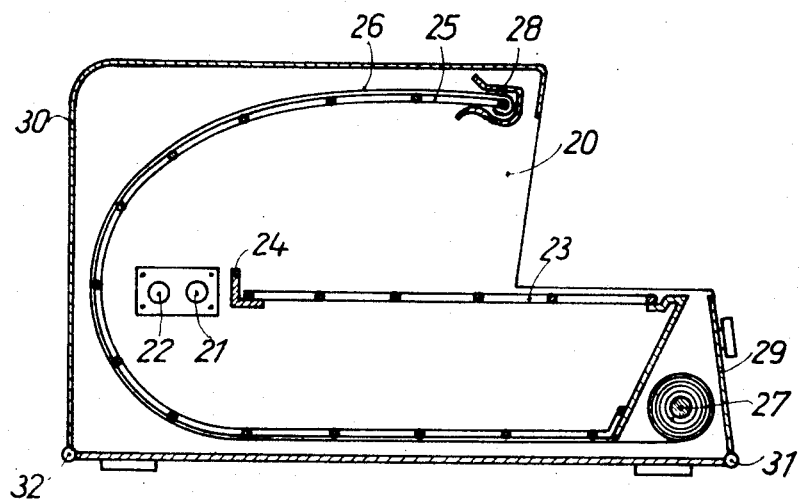
FIG. 3 is a vertical sectional view, similar to FIG. 2, but embodying a modification.

In the modification shown in FIG. 3, there is provided a housing with a foodstuff receiving chamber 20. In the chamber 20 there is provided a heat source that is composed of two heating rods 21 and 22, and next to the heat source there is provided a sheet 24 in front of which there is removably emplaced a foodstuff carrier 23.

A support means 25 is provided against which there is applied a reflector metal foil 26.

In contrast to the embodiment of FIGS. 1 and 2, however, the support means 25 of FIG. 3 is formed as a rigid grid, and the metal foil 26 is placed around the external convex surface of the support means 25.

In further distinction over the previous embodiment, the metal foil 26 extends to the bottom of the chamber 20, thereby dispensing with the need for any receptacle, such as the receptacle 18.

Furthermore, the metal foil 26 forms a part of a metal foil roll 27. This offers the advantage of greater facility in exchanging the soiled metal foil for a clean one.

The free end of the metal foil 26 is clamped to the support 25 by means of clamp means, such as a clamp 28. The front cover 29 of the housing is hinged at 31, and the top and rear cover 30 of the housing is hinged at 32.

In order to exchange the reflector 26, the operator will tilt the top and rear cover 30 about its hinge 32, thereby exposing the metal foil 26, and will disengage it from the support means 25 by removing the clamp 28. Thereafter, the operator will pull the necessary amount from the roll 27 and place it, as shown in FIG. 3, around the support means 25 and lock it in position by the clamp 28, and subsequently close again the top and rear cover 30.

These replacements may be continued until the roll 27 of the metal foil is used up. To replace the roll of metal foil 27, the operator will open the front cover 29 by tilting it about its hinge 31 and place a fresh roll 27 of metal foil in the position shown in FIG. 3.

As previously indicated, in connection with the embodiment shown in FIGS. 1 and 2, the metal foil 10 on its convex side may have an adhesive, preferably a self-sticking adhesive coating, for facilitating the lining of the backing 2 with the metal foil 10 in uncrumpled form.

OPERATION

In the modification of FIGS. 2a and 3a, the respective parts are turned about the hinges 32 and 33, respectively, to open and close the support means 2, 25 and the cover 30, respectively.

The operation of the preceding embodiments has been described in detail. Suffice it to reiterate here that in the embodiment of FIGS. 1 and 2, the exchange is carried out by replacing the sheet metal foil 10, by first disengaging the supports 12, then removing the metal foil 10, and replacing it by a new metal foil 10, and subsequently replacing and re-engaging the supports 12.

In the modification of FIG. 3, the operator will tilt the top and rear cover 30 about its hinge 32 and disengage the clamp 28, and then pull a new reflector length from the supply roll 27, and subsequently replace the cover 30 into the position shown in FIG. 3.

Certain of the advantages of the invention have already been herein referred to. It may be useful, however, to allude particularly at this point to the simplicity of the instant device which at low cost and without any special skill provides for a food heat treating device that will always have a clean reflector surface.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. A device for heat treating, such as toasting and/or grilling, foodstuff, comprising in combination
   a. a housing,
   b. a carrier for the foodstuff to be heat treated operable to be at least temporarily supported by said housing,
   c. a heat source disposed in said housing, and
   d. reflector means disposed in said housing and operable for guiding heat rays from said heat source towards the foodstuff on said carrier and comprising support means mounted with relation to said housing and defining a contour forming the reflector shape, and
   a single sheet of flexible metal foil bent concavely to form a reflector supported easily exchangeably with relation to said support means.
2. A device, as claimed in claim 1, said flexible metal foil being easily removably aligned along said contour of said support means.
3. A device, as claimed in claim 1, said reflector being removably held against said support means.
4. A device, as claimed in claim 1, said flexible metal foil reflector lining said support means.
5. A device, as claimed in claim 1, said support means including a backing and a support, said reflector being supported between said support and backing.
6. A device, as claimed in claim 1, said support means including a backing for said reflector forming a continuous wall.
7. A device, as claimed in claim 1, said support means including a grid.
8. A device, as claimed in claim 1, said support means being composed of resilient material.
9. A device, as claimed in claim 1, and a roll of said flexible metal foil material disposed in said housing.
10. A device, as claimed in claim 1, and a roll of said flexible metal foil disposed in said housing and including a portion of said flexible metal foil unrolled therefrom, said reflector forming a part of said unrolled portion.
11. A device, as claimed in claim 1, said support means being hinged to said housing.
12. A device, as claimed in claim 1, said reflector including an adhesive on one of its major surfaces disposed oppositely relative to said heat source.
13. A device for heat treating, such as toasting and/or grilling, foodstuff, comprising in combination
    a. a housing,
    b. a carrier for the foodstuff to be heat treated operable to be at least temporarily supported by said housing,
    c. a heat source disposed in said housing, and
    d. reflector means disposed in said housing and operable for guiding heat rays from said heat source towards the foodstuff on said carrier and comprising support means mounted with relation to said housing and
    a flexible metal foil reflector supported easily exchangeably with relation to said support means, said support means including at least one support in the form of a curved clip.
14. A device for heat treating, such as toasting and/or grilling, foodstuff, comprising in combination
    a. a housing,
    b. a carrier for the foodstuff to be heat treated operable to be at least temporarily supported by said housing,
    c. a heat source disposed in said housing, and
    d. reflector means disposed in said housing and operable for guiding heat rays from said heat source towards the foodstuff on said carrier and comprising support means mounted with relation to said housing and
    a flexible metal foil reflector supported easily exchangeably with relation to said support means, and clamp means operable for connecting releasably said reflector to said support means.

* * * * *